Oct. 6, 1959 A. LYSHOLM 2,907,171
COMBUSTION CHAMBER INLET FOR THERMAL POWER PLANTS
Filed Feb. 15, 1954 5 Sheets-Sheet 1
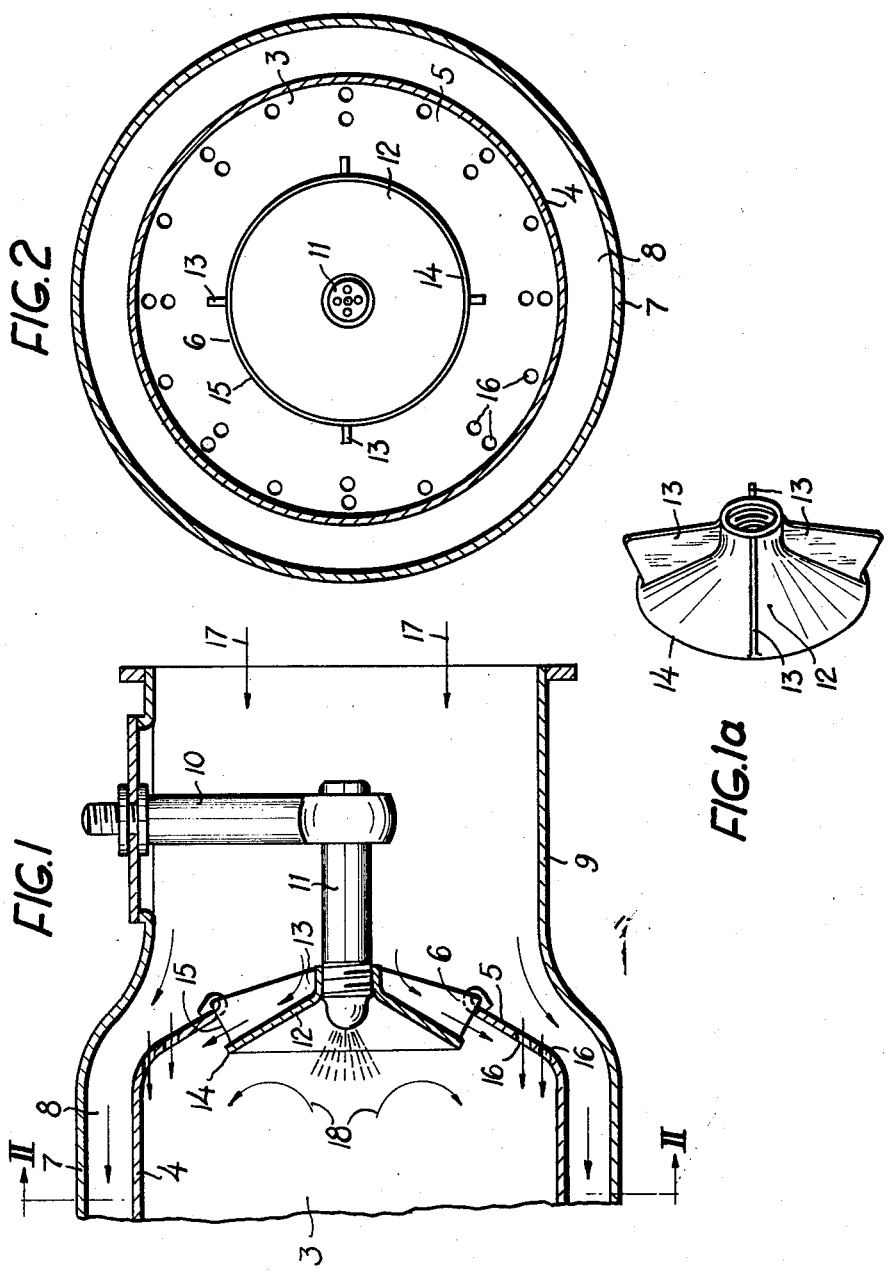
INVENTOR
Alf Lysholm
BY
Cushman, Darby & Cushman
ATTORNEYS Oct. 6, 1959 A. LYSHOLM 2,907,171
COMBUSTION CHAMBER INLET FOR THERMAL POWER PLANTS
Filed Feb. 15, 1954 5 Sheets-Sheet 2
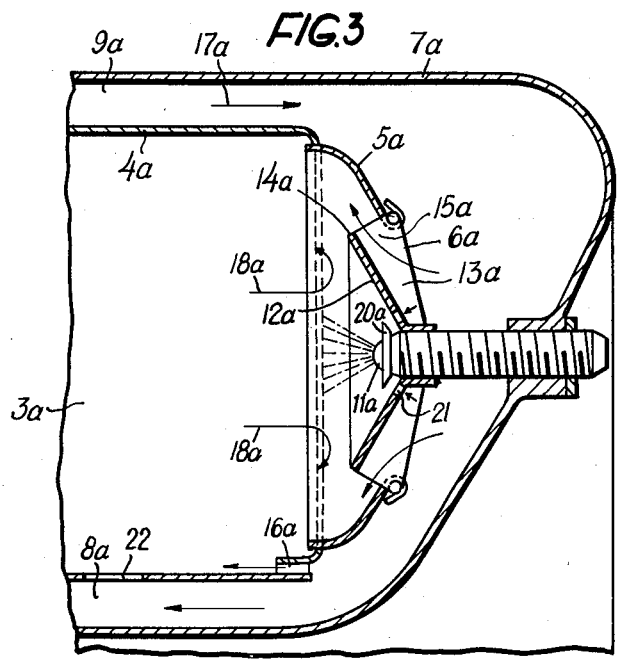
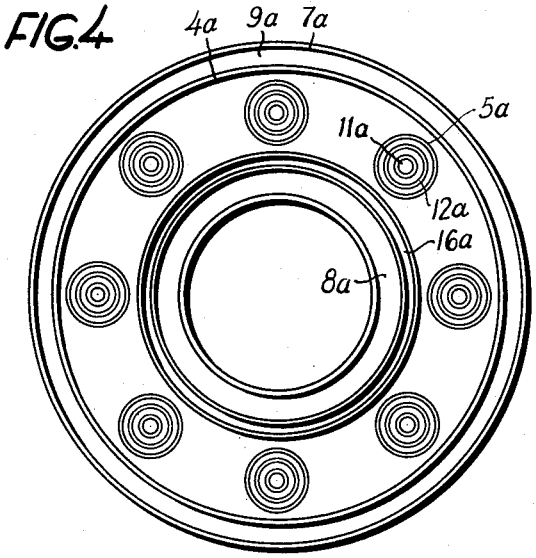
INVENTOR
Alf Lysholm
BY Cushman, Darby & Cushman
ATTORNEYS

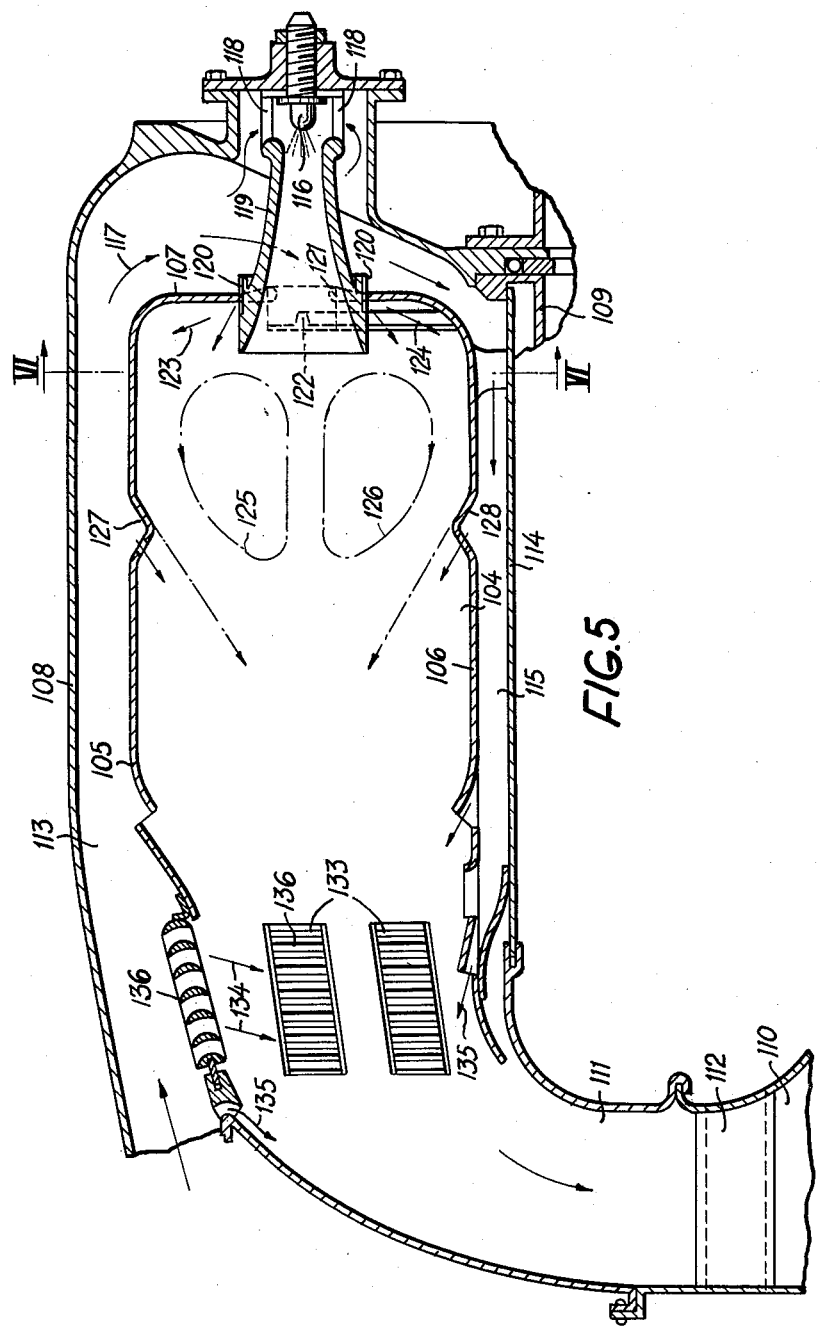

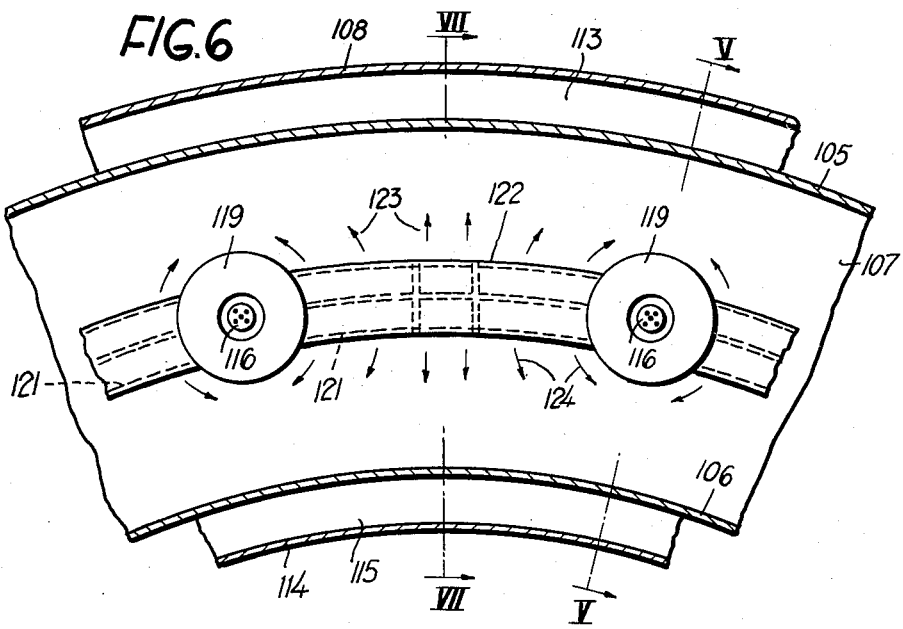
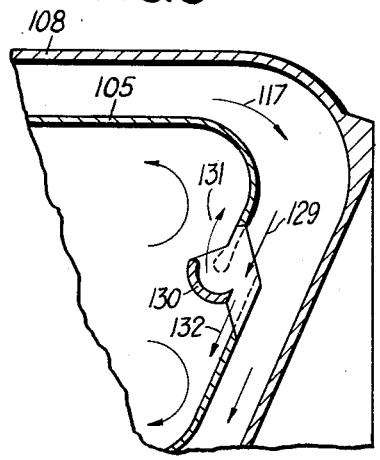
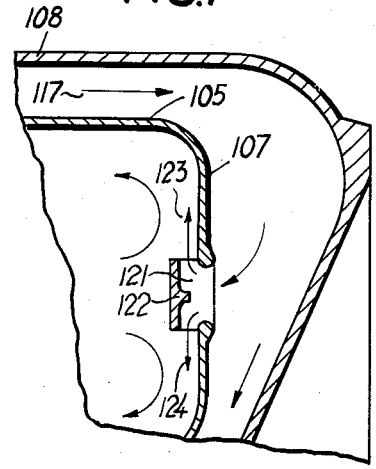

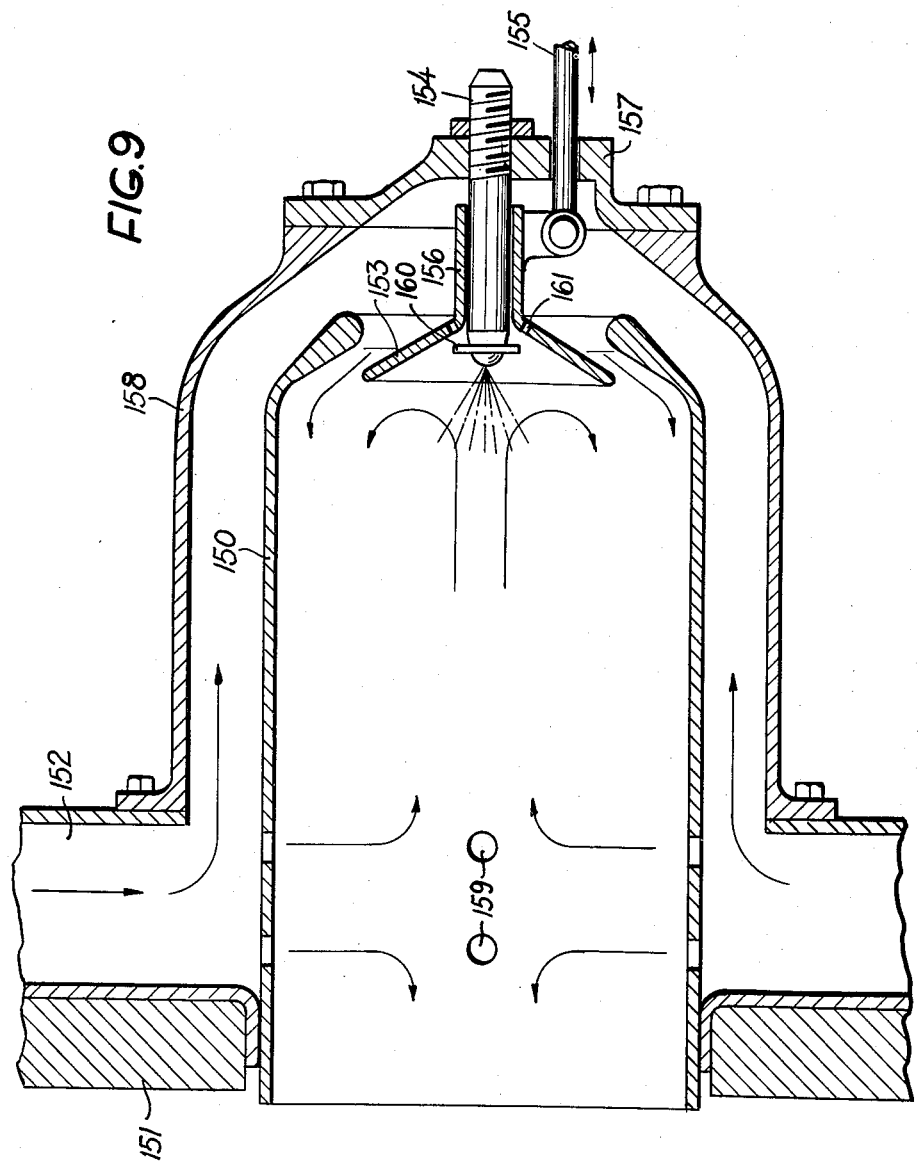

United States Patent Office 2,907,171
Patented Oct. 6, 1959

2,907,171

COMBUSTION CHAMBER INLET FOR THERMAL POWER PLANTS

Alf Lysholm, Stockholm, Sweden

Application February 15, 1954, Serial No. 410,241

1 Claim. (Cl. 60—39.65)

This invention relates to combustion chambers for gas turbines, jet projulsion plants, steam generators and the like, and the object of the invention is to provide means to secure efficient combustion in a combustion chamber having comparatively small dimensions.

The application is a continuation-in-part of my patent application Serial No. 174,884, filed July 20, 1950, now abandoned.

In the annexed drawings there are illustrated four embodiments of the invention.

Fig. 1 is a longitudinal sectional view of part of a cylindrical combustion chamber provided with means for the supply of fuel and air; Fig. 1a is a perspective rear view of a deflector plate used in the construction shown in Fig. 1; Fig. 2 is a section of the combustion chamber taken on line II—II, Fig. 1; Fig. 3 is a sectional view of part of a second embodiment having an annular combustion chamber; Fig. 4 is an end view of this chamber to a reduced scale as viewed from the left of Fig. 3; Fig. 5 is a longitudinal sectional view of a third embodiment, the section being taken on line V—V, Fig. 6; Fig. 6 illustrates part of the devices for the supply of fuel and air as viewed in the direction of the arrows VI—VI in Fig. 5; Fig. 7 is a section on line VII—VII in Fig. 6; Fig. 8 illustrates a slightly modified construction of the air supplying means, and Fig. 9 illustrates a combustion chamber intended particularly for a boiler.

The combustion chamber 3 shown in Figs. 1 and 2 has a cylindrical wall 4 and a slightly conical end wall 5 in which a central opening 6 is provided. The combustion chamber is surrounded by an outer shell 7. Between the parts 4 and 7 there is provided an annular passage 8. The shell 7 is in communication with a duct 9 which in turn communicates with the discharge end of a compressor not shown. Numeral 10 denotes a fuel pipe and numeral 11 a fuel nozzle connected to the fuel pipe and located substantially centrally in the opening 6. Near the inner end of the fuel nozzle there is mounted a deflector plate 12, which is slightly inclined towards the interior of the combustion chamber and by means of radial fins 13 abuts against the end wall 5 of the chamber. The outer edge 14 of the deflector plate is located at some distance from the edge of the opening 6, so as to form an annular slot 15 between said edges. As shown in the drawing the edge of the opening 6 is well rounded and with the deflector plate 12 forms a bell mouth nozzle having an inlet for substantially axial flow and an outlet for substantially radial flow and having a cross-sectional area decreasing from the inlet to the outlet of the nozzle to secure efficient conversion of pressure into velocity. The nozzle is further adapted for causing the primary air on entering the combustion chamber to follow the end wall 5 in the radial direction without separation therefrom. Near the inner periphery of the combustion chamber there are provided apertures 16 in the end wall 5 for admitting a further supply of air but the area of the bell mouth opening in relation to the total area of these additional openings is such that the main part of the primary air is admitted through the bell mouth opening.

The air entering in the direction of the arrows 17, which may be mixed with exhaust gases from a gas turbine, is admitted into the combustion chamber partly through the slot 15, partly through the apertures 16 and partly through the passage 8 outside the combustion chamber to be supplied as secondary air. The primary air entering through the bell mouth nozzle follows the end wall 5 in the radial direction and at such velocity as to induce a flow from the interior of the combustion chamber towards the fuel nozzle as indicated by the arrows 18. Into this flow or whirl zone the fuel is injected and intimately mixed with the combustion air. The primary air is then deflected by the circumferential wall into the axial direction so as to form a return flow merging into the whirl zone. Owing to the design of the nozzle 15 the primary air thus enters at a comparatively high velocity, sufficient for creating a well developed whirl zone, but at the periphery of the circumferential wall the velocity in the axial direction is slowed down so that the combustion zone becomes located at a point near the point at which the fuel is injected. The primary air following the end wall on the inside thereof also serves to prevent deposition of carbon on the end wall. The portion of the air entering through the apertures 16 serves as cooling air for the wall 4 of the chamber and as primary and secondary combustion air. The wall of the combustion chamber is also cooled at its outer side by the air passing through the passage 8, said air being then introduced into the chamber in a conventional manner, such as an opening in wall 4, not shown, so as to serve as secondary combustion air, too.

In Fig. 3 there is illustrated a slightly modified embodiment in connection with an annular combustion chamber. The parts which have the same purpose as those shown in Fig. 1, are indicated by similar reference numerals with the index letter $a$.

The compressed air which flows through the passage $9a$ in the direction of the arrow $17a$ is divided into several portions, one of which enters the combustion chamber $3a$ in a substantially radial direction through the bell mouth nozzle $15a$. Another portion of the air enters the combustion chamber in a substantially axial direction through openings $16a$, and a still further portion of the air passes outside the combustion chamber through the passage $8a$. Part of the last named air portion flows through openings 22 in the inner cylindrical wall of the combustion chamber into the space $3a$.

In this embodiment, a deflector $20a$ is provided on the fuel nozzle $11a$ at a short distance from the deflector $12a$, the deflector $20a$ having a considerably smaller diameter than the other deflector. The deflector 20 has a face located substantially parallel to the extension of the deflector $12a$ in opposite relation to said face. The deflector $12a$ has a number of small apertures 21 for the passage of a small air portion which flows along the inner face of the deflector $12a$. The purpose of this air stream is to prevent deposition of carbon on the surface of the deflector plate $12a$ facing the interior of the combustion chamber.

As will be seen from Fig. 4 a plurality of the devices described with reference to Fig. 3 are equidistantly and annularly disposed in the annular end wall of the combustion chamber.

The combustion chamber 104 shown in the Figs. 5 to 7 is annular and radially defined by two concentric and substantially cylindrical walls 105 and 106, and by a rear end wall 107. An outer shell 108 surrounds the combustion chamber in a spaced relation thereto and is connected with the radially inwardly located casing 109 of a gas turbine not shown, which is driven by the products of combustion from the chamber 104. The inlet conduit 110 of the turbine is connected with the inwardly bent front portion 111 of the combustion chamber and is provided with guide vanes 112, which are preferably hollow and adapted to be cooled by air. Between the parts 105 and 108 there is formed an annular passage 113 for the combustion air. Inside the inner wall 106 of the combustion chamber, there is provided a cylindrical shell 114. Between the parts 106 and 114 there is formed an inner annular passage 115 which constitutes a continuation of the passage 113.

Fuel is supplied to the combustion chamber by means of a number of annularly disposed fuel atomizers 116. Part of the air arriving from the passage 113 in the direction of the arrow 117 passes through openings 118 to the atomizer for the purpose of atomizing the fuel. The fuel air mixture is admitted to the combustion chamber through nozzles 119, the front ends of which extend through openings in the end wall 107 of the combustion chamber. Through a number of slots 120 around each nozzle, a portion of the air from the passage 113 enters the combustion chamber and serves as cooling air.

Between the openings for the nozzles 119, openings 121 are provided in the end wall 107, said openings 121 extending from each of the nozzles to the next one. The openings 121 have well rounded inlet edges. At some distance in front of each opening 121, there is provided a deflector plate 122 shaped in such manner as to divide the air entering through opening 121 into two portions which sweep over the rear wall 107 of the combustion chamber in mutually opposite and substantially radial directions on either side of each fuel nozzle. These air portions indicated by the arrows 123 and 124 give rise to two whirl zones 125 and 126, respectively. Both whirl zones are annularly shaped, as viewed in a cross section through the combustion chamber, the zone 125 being located at a greater radius, and the zone 126 at a smaller radius from the axis of the annular combustion chamber than the axes of the fuel nozzles.

The inlet edges of the openings 121 are well rounded and the deflector plates are designed to form with these openings nozzles of the bell mouth type. It is to be noted that taken together the nozzles have two openings which are annular, bell mouth shaped and substantially continuous in the peripheral direction.

Fuel is injected into the whirl zones and intimately mixed with the combustion air so as to secure a high efficiency of combustion with small losses in pressure. In addition thereto, the rear portion of the combustion chamber is effectively cooled by the radially entering air portions. Due to this fact, the combustion will commence near the fuel nozzles, resulting in comparatively small dimensions of the combustion chamber.

By means of inwardly projecting portions 127 and 128 in the walls 105 and 106, respectively, a concentration of the combustion zone towards the central portion of the chamber is obtained. Secondary combustion air and cooling air is supplied at several places from the passages 113 and 115, as indicated by arrows. Cooling air mixed with the products of combustion and entering in the direction of the arrows 134 is guided through substantially rectangular openings 133 provided with guide vanes 136. Cooling air for the walls of the combustion chamber enters in the direction of the arrows 135.

A slightly modified construction of the bell mouth nozzle is shown in Fig. 8. The air entering in the direction of the arrow 129 is divided, by means of a guide member 130, into two portions, 131 and 132, which are deflected in substantially radial directions such as a sweep along the rear wall of the combustion chamber. In other respects the mode of operation is similar to that described with reference to Figs. 4 to 7.

Fig. 9 illustrates a combustion chamber according to the invention for a boiler. The arrangement is similar to that shown in Figs. 1 and 2. The circumferential wall 150 of the combustion chamber is inserted in the brick wall 151 of the boiler. Air is supplied through the annular chamber 152. Provision is made for adjustment of the deflector plate 153 in the axial direction of the combustion chamber for control of the rate of primary air supplied. For this purpose the deflector plate is slidable on the fuel nozzle 154 and operable for adjustment in the axial direction by means of rod 155 linked to the sleeve 156 of the deflector plate and passing through the end wall 157 of the outer shell 158. Annular rows of holes 159 are provided for supplying secondary air. As in Fig. 2 the fuel nozzle 154 has a circular deflector plate 160, and holes 161 are provided in the deflector plate 153 for admitting air to follow the surface of the deflector plate 153 facing the interior of the combustion chamber for preventing deposition of carbon.

The arrangement described for controlling the rate at which the primary air is supplied through the bell mouth nozzle may be applied to the other embodiments described and shown but is particularly intended for combustion chambers to be used with boilers for generation of steam, in which case it is desirable to be able to vary the rate at which the primary air is supplied.

Common to all embodiments shown and described is that the openings for admitting the main part of the primary combustion air are nozzles, not just openings. They are of the type called bell mouth nozzles meaning that the nozzles have a decreasing cross sectional area in the direction of flow for smooth flow and for converting the pressure drop available into velocity. They are further designed for directing the primary air as entering the combustion chamber so as to follow the end wall of the combustion chamber without separation therefrom. It is the high velocity of the air in following the end wall without separation which is productive of the result desired, i.e. the creation of an efficient whirl zone near the point of introduction of the fuel. It is also to be noted that in all the embodiments shown and described provision is made for smooth deflection of the primary air in being deflected from the substantially radial into the substantially axial direction.

What I claim is:

A combustion chamber assembly of the class described including an annular elongated outer shell, an elongated cylindrical combustion chamber within said shell, said combustion chamber having an inner end spaced from the adjacent end of said shell so as to form an air chamber therebetween, the inner end of said combustion chamber having a relatively large central opening, the wall of which is bent to form a rounded edge, a fuel supply means extending into said air chamber and having a centrally and axially disposed nozzle projecting into the open end of said combustion chamber, an annular deflector plate having a central tubular hub through which said nozzle extends into the combustion chamber, said deflector plate having circumferentially spaced radial ribs extending into said air chamber and projecting radially from said hub, said ribs co-acting with said deflector plate to provide a bell-mouth nozzle providing an inlet passage for substantially axial flow and an outlet passage for substantially radial flow, said passages having a cross-sectionl area decreasing from the inlet to the outlet of the bell-mouth nozzle, the outlet of said bell-mouth nozzle being located to cause the flow of air to follow the inner wall of said combustion chamber without separation therefrom and then be deflected in the axial direction to form a return flow and a whirl zone near said fuel nozzle, said deflector plate being inclined towards the interior of the combustion chamber and having its outer edge spaced a substantial distance from the inlet opening so as to form a radial slot therewith, the inlet end of said combustion chamber having relatively small apertures communicating with said air chamber, the parts being constructed and arranged so that the air enters at comparatively high velocity in order to develop the whirl zone, the velocity of the air introduced axially into the combustion chamber being slowed down so that the combustion zone is located at a point near to the point at which the fuel is injected, and said apertures providing means for introducing cooled air into the combustion chamber.

References Cited in the file of this patent

UNITED STATES PATENTS

| | | |
|---|---|---|
| 2,577,918 | Rowe | Dec. 11, 1951 |
| 2,581,999 | Blatz | Jan. 8, 1952 |
| 2,601,000 | Nerad | June 17, 1952 |
| 2,638,745 | Nathan | May 19, 1953 |
| 2,658,337 | Clarke et al. | Nov. 10, 1953 |
| 2,711,631 | Willgoos | June 28, 1955 |
| 2,716,330 | Way | Aug. 30, 1955 |
| 2,741,090 | Johnson | Apr. 10, 1956 |